P. N. SCHRUM.
CULTIVATOR.
APPLICATION FILED OCT. 7, 1921.

1,434,028.

Patented Oct. 31, 1922.

2 SHEETS—SHEET 1.

Inventor,
Peter N. Schrum,
By Dyrenforth, Lee, Chritton & Wiles,
Attys.

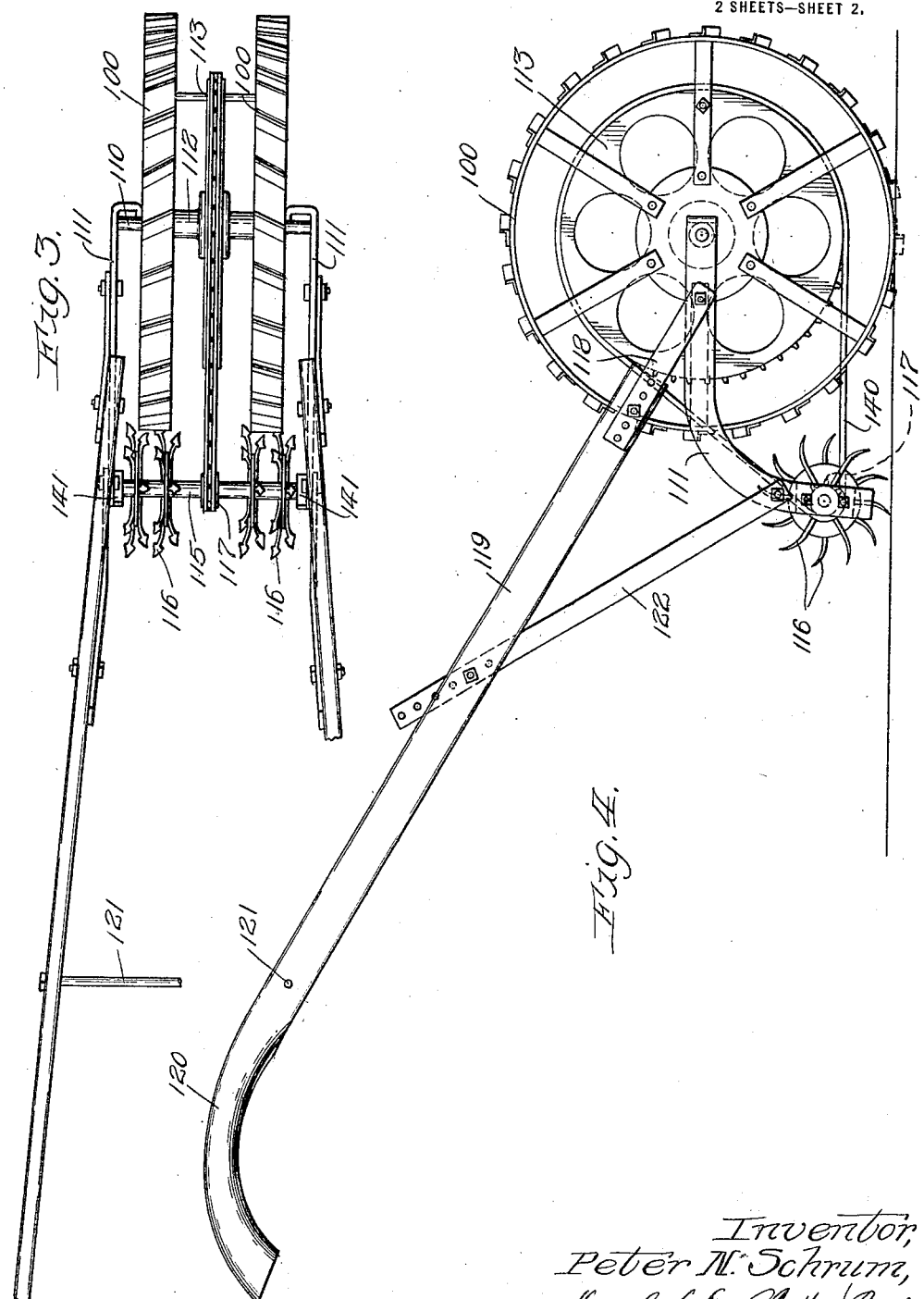

Patented Oct. 31, 1922.

1,434,028

UNITED STATES PATENT OFFICE.

PETER N. SCHRUM, OF LANSING, ILLINOIS.

CULTIVATOR.

Application filed October 7, 1921. Serial No. 506,075.

*To all whom it may concern:*

Be it known that I, PETER N. SCHRUM, a citizen of the United States, residing at Lansing, in the county of Cook and State of Illinois, have invented a new and useful Improvement in Cultivators, of which the following is a specification.

This invention relates to improvements in cultivators. My improved cultivator can be easily and cheaply made and is simple in construction. It is also easy to operate and does very effective work in practically all kinds of soils.

Figure 1:
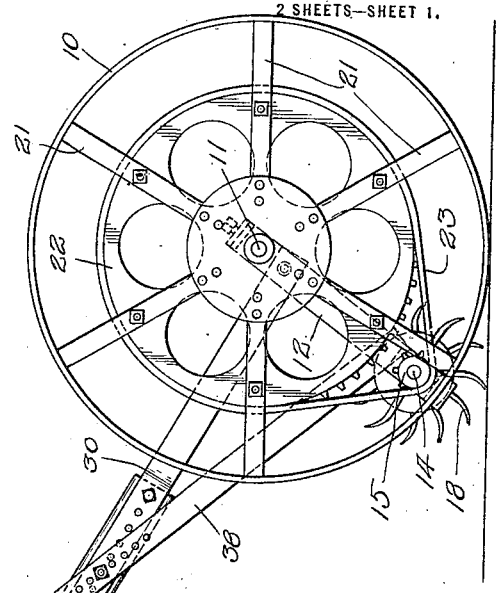
Figure 2:
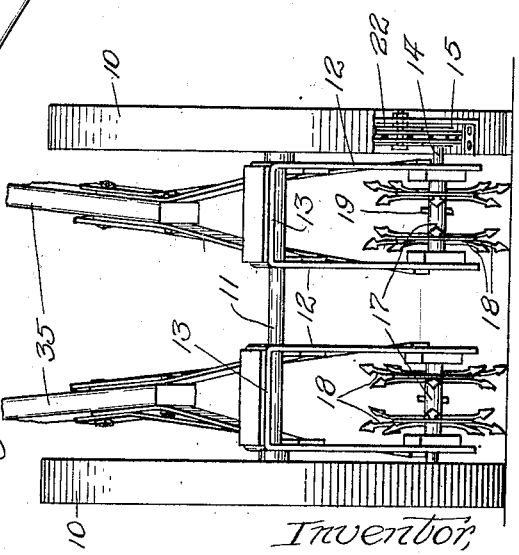

A device embodying the features of my invention is shown in the accompanying drawings, in which Fig. 1 is a view in side elevation of a cultivator, Fig. 2 is a view of the same in front elevation, Fig. 3 is a top plan view of a modified form thereof, and Fig. 4 is a view of the modified form in side elevation.

As shown in the drawings, the cultivator comprises a pair of large tractor wheels 10 joined by an axle 11. Depending from the axle 11, and rotatably mounted thereon are two pairs of straps 12, each pair being joined at the upper ends by a cross member 13 in order to space, strengthen and support the same.

Between the lower ends of each pair of straps 12 is rotatably mounted in suitable bearings a short shaft 14, one end of which projects outwardly through the strap a short distance and carries at its end a small sprocket 15. Rigidly mounted on each shaft 14 between the straps 12 is a sleeve 17 carrying radially mounted blades 18, of sufficient length to cut into the soil when the cultivator is in use. The sleeve 17 is held against rotation on the shaft 14 in any suitable manner such as by means of a pin 19 projecting through suitable wheels in the shaft and sleeve.

Each of the tractor wheels 10 has mounted on it in any suitable manner, such as by means of bolts extending through the spokes 21, a large sprocket wheel 22, which is in line with the sprocket 15. A chain 23 extends over the large sprocket 22 and the small sprocket 15 on each side of the cultivator.

Each pair of straps 12 has joined to them near their upper ends, just below the axle 11, substantially at right angles, rearwardly projecting straps 30, the rear ends of which are brought close together to support a wooden bar 35 having a handle 36 formed at its end. Diagonal braces 38 are provided connecting the rearward ends of the members 30 with the lower ends of the straps 12, in order to strengthen and support the structure and make the same more rigid.

The straps 12 are of such a length, and the tools 18 are of such a length and the other parts of the cultivator are so proportioned that when the handles 36 are in the position shown in Fig. 1, the ends of the tools 18 will just touch the ground on which the cultivator rests. When in this position it will be noted that the straps 12 are not vertical, but slant downwardly and rearwardly from the axle 11. It will be noted that by this construction lowering of the handles 36 will cause the tools 18 to enter the soil. It will be seen, therefore, that the desired cutting depth of the tools 18 may be obtained by raising or lowering the handles 36.

In the operation of the device it is propelled in any suitable manner, such as by grasping the handles 36 and pushing the same, whereupon the chains 23 will rotate the shafts 14 and consequently the blades 18, thus cultivating the soil to any desired depth within the range of the device as noted above. It will be noted that the two pairs of straps 12 are separated from each other a short distance on their inner sides, thus giving the cultivator a great clearance at the center which will be found very desirable in double row cultivating and other kinds of work.

In Figs. 3 and 4, I have shown a modified form of device which does not have the center clearance shown in the preferred form.

In this modified form, a pair of large tractor wheels 100 are mounted relatively close together on the axle 110, which is supported between the members 111. Between the wheels 100 and connected thereto is a hub 112 carrying a large sprocket wheel 113. The members 111 extend rearwardly from the ends of the axle 110 and are bent downwardly at their rear ends. Rotatably mounted in any suitable manner between the lower ends of the members 111 is a shaft 115, carrying radially mounted thereon the cutting tools 116. The center of the shaft 115 is provided with a small sprocket 117, which is in line with the large sprocket 113. The sprockets 113 and 117 are connected by a driving chain 140.

The members 111 carry near their forward ends upwardly and rearwardly projecting straps 118 to each of which is fastened a wooden bar 119 having at its rear end a handle 120. The two handles 120 are connected by a horizontal bar 121. A diagonal strap 122 connects the wooden bar 119 at about its center to the member 111, in order to strengthen and support the structure.

The operation of the modified form is substantially the same as that of the preferred form. The cultivator is propelled in any suitable manner. Raising or lowering of the handles 120 will cause the tools 116 to enter the soil to any desired depth within the range of the device.

Means are provided in both the preferred form and the modified form for readily changing the tools used in cultivating. I have here shown these tools as comprising rather thin twisted knives with flattened curved arrow shaped heads. If desired, however, tools of any other shape may be substituted. In the preferred form of device, this substitution is effected by removing the chain 23 and pin 19, whereupon the shaft 14 may be taken out, and sleeve with any other shaped tools substituted for the sleeve shown. In the modified form, likewise, the chain 140 may be removed, and the bearing blocks 141 thus permitting the shaft 115 carrying the tools 116 be taken out whereupon another shaft with different tools may be substituted.

Although, I have shown and described certain embodiments of my invention, it is to be understood that it is capable of many modifications. Changes, therefore, in the construction and arrangement may be made without departing from the spirit and scope of the invention as disclosed in the appended claim, in which it is my intention to claim all novelty inherent in my invention as broadly as possible in view of the prior art.

What I claim as new and desire to secure by Letters Patent, is:

A cutivator comprising a pair of tractor wheels mounted on an axle, a handle attached to the cultivator for propelling the same, a pair of straps rotatably mounted by their ends on said axle, a brace connecting the handle and one of said straps, a shaft rotatably mounted between the free ends of said straps, cultivating tools arranged on said shaft, and means for driving said shaft from one of the tractor wheels.

In testimony whereof I have hereunto set my hand and seal this 6 day of October, 1921.

PETER N. SCHRUM.